(12) United States Patent
Barea-Egana

(10) Patent No.: US 10,267,235 B2
(45) Date of Patent: Apr. 23, 2019

(54) AIRCRAFT FUEL SYSTEM WITH A BYPASS VALVE FOR A RETURN VALVE DURING ENGINE OFF OPERATION

(71) Applicant: AIRBUS OPERATIONS (S.A.S.), Toulouse (FR)

(72) Inventor: Inigo Barea-Egana, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 784 days.

(21) Appl. No.: 14/933,232

(22) Filed: Nov. 5, 2015

(65) Prior Publication Data

US 2016/0131042 A1 May 12, 2016

Related U.S. Application Data

(60) Provisional application No. 62/076,290, filed on Nov. 6, 2014.

(30) Foreign Application Priority Data

Dec. 4, 2014 (FR) .................................. 14 61897

(51) Int. Cl.
*F02C 7/232* (2006.01)
*F02C 6/08* (2006.01)
(Continued)

(52) U.S. Cl.
CPC .............. *F02C 7/232* (2013.01); *F02C 6/08* (2013.01); *F02C 7/14* (2013.01); *F02C 7/236* (2013.01);
(Continued)

(58) Field of Classification Search
CPC .. F02C 7/22; F02C 7/232; F02C 7/236; F02C 7/32; F02C 7/36; F02C 9/26; F02C 9/263; Y10T 137/87338
See application file for complete search history.

(56) References Cited

U.S. PATENT DOCUMENTS 2,826,216 A * 3/1958 Thomas .................... G01F 1/26
137/503
3,779,007 A * 12/1973 Lavash ..................... F02C 7/14
60/241
(Continued)

FOREIGN PATENT DOCUMENTS

DE    10127196 A1    12/2002
GB    2282416 A     5/1995

OTHER PUBLICATIONS

Search report from French Application No. 1461897, dated Jul. 12, 2017.

*Primary Examiner* — Todd E Manahan
*Assistant Examiner* — Eric W Linderman
(74) *Attorney, Agent, or Firm* — Greer, Burns & Crain Ltd.

(57) ABSTRACT

A fuel system which includes a fuel return system. The fuel return system includes a fuel return valve arranged on a return line, and the return line is intended to be mounted between an engine of an aircraft and a fuel tank of the aircraft. The return valve is configured to allow a return of fuel from the engine to the fuel tank when the engine is in operation. The fuel return system also includes a bypass valve assembly mounted in parallel to the return valve, and is configured to allow a return of fuel from the engine to the fuel tank when the engine is not in operation.

4 Claims, 4 Drawing Sheets

(51) Int. Cl.
  *F02C 7/14* (2006.01)
  *F02C 7/236* (2006.01)
  *F02C 9/26* (2006.01)
  *F02C 7/36* (2006.01)
  *F02C 7/32* (2006.01)

(52) U.S. Cl.
  CPC .............. *F02C 7/32* (2013.01); *F02C 7/36* (2013.01); *F02C 9/26* (2013.01); *F02C 9/263* (2013.01); *F05D 2260/602* (2013.01)

(56) References Cited

U.S. PATENT DOCUMENTS

| | | | | |
|---|---|---|---|---|
| 3,901,025 A * | 8/1975 | Bryerton | | F02C 7/22 60/39.094 |
| 3,913,314 A * | 10/1975 | Yannone | | F02C 7/22 60/39.27 |
| 4,033,112 A * | 7/1977 | Schuster | | F02C 9/32 60/39.281 |
| 4,041,697 A * | 8/1977 | Coffinberry | | F02C 7/14 123/41.33 |
| RE30,653 E * | 6/1981 | Schuster | | F02C 9/32 60/39.281 |
| 4,339,917 A * | 7/1982 | LaGrone | | F02C 7/236 137/565.32 |
| 4,354,345 A * | 10/1982 | Dreisbach, Jr. | | F02C 7/14 60/39.08 |
| 4,394,811 A * | 7/1983 | Swick | | F02C 7/232 60/39.281 |
| 4,696,156 A * | 9/1987 | Burr | | F01D 25/18 60/39.08 |
| 4,736,582 A * | 4/1988 | Smith | | F02C 9/263 60/39.281 |
| 4,747,263 A * | 5/1988 | Gerard | | F02C 9/26 60/39.281 |
| 4,899,535 A * | 2/1990 | Dehan | | F02C 7/14 60/39.08 |
| 5,195,494 A | 3/1993 | Tuckey | | |
| 5,245,819 A * | 9/1993 | Kast | | F02C 7/236 123/198 D |
| 5,339,636 A * | 8/1994 | Donnelly | | F02C 7/228 137/100 |
| 5,660,358 A * | 8/1997 | Grafwallner | | B64D 37/14 137/565.17 |
| 5,865,212 A * | 2/1999 | Gaines | | F16K 47/10 137/493 |
| 6,135,135 A * | 10/2000 | Futa, Jr. | | F02C 7/232 137/115.03 |
| 6,195,978 B1 * | 3/2001 | Futa, Jr. | | F02C 7/232 60/39.094 |
| 6,250,894 B1 * | 6/2001 | Dyer | | F02C 7/236 137/114 |
| 6,328,056 B1 * | 12/2001 | Kumar | | F02C 7/232 137/115.09 |
| 6,442,925 B1 * | 9/2002 | Dalton | | F02C 7/232 60/39.094 |
| 6,591,851 B1 * | 7/2003 | Palten | | F04D 19/04 137/12 |
| 7,007,452 B1 * | 3/2006 | Baryshnikov | | F02C 7/232 60/39.094 |
| 7,775,191 B2 * | 8/2010 | Hou | | F02D 41/3836 123/458 |
| 8,991,152 B2 * | 3/2015 | Heitz | | F02C 7/22 60/243 |
| 9,206,775 B2 * | 12/2015 | Ripley | | F02C 7/236 |
| 9,650,960 B2 * | 5/2017 | Vertenoeuil | | F02C 7/22 |
| 9,702,301 B2 * | 7/2017 | Potel | | F02C 7/22 |
| 2003/0056521 A1 * | 3/2003 | Dewis | | F02C 7/26 60/778 |
| 2003/0136103 A1 * | 7/2003 | Reuter | | F01D 25/20 60/39.08 |
| 2003/0233823 A1 * | 12/2003 | Futa, Jr. | | F02C 7/228 60/39.094 |
| 2004/0003597 A1 * | 1/2004 | Wieger | | F02C 9/263 60/773 |
| 2005/0016176 A1 * | 1/2005 | Griffiths | | F02C 9/28 60/734 |
| 2005/0166573 A1 * | 8/2005 | Hommema | | F02C 9/263 60/39.281 |
| 2005/0178433 A1 * | 8/2005 | Zelczer | | G05D 7/03 137/115.23 |
| 2005/0217236 A1 * | 10/2005 | Wernberg | | F02C 7/232 60/39.281 |
| 2005/0252557 A1 * | 11/2005 | Kabu | | B01J 19/002 137/599.01 |
| 2005/0262824 A1 * | 12/2005 | Yates | | F02C 7/232 60/39.281 |
| 2005/0268972 A1 * | 12/2005 | Gainford | | F02C 7/22 137/601.14 |
| 2005/0279079 A1 | 12/2005 | Baryshnikov et al. | | |
| 2006/0236981 A1 * | 10/2006 | Bickley | | F01D 21/00 123/506 |
| 2007/0044768 A1 * | 3/2007 | Eick | | F02C 7/22 123/478 |
| 2007/0051089 A1 * | 3/2007 | Lewis | | F02C 7/232 60/39.281 |
| 2007/0107435 A1 * | 5/2007 | Bickley | | F02C 7/236 60/773 |
| 2007/0113554 A1 * | 5/2007 | Yates | | F02C 7/236 60/734 |
| 2008/0142100 A1 * | 6/2008 | Spickard | | F02C 7/232 137/625.6 |
| 2008/0236549 A1 * | 10/2008 | Bickley | | F02C 7/232 123/504 |
| 2009/0094974 A1 * | 4/2009 | Galozio | | F02C 7/232 60/433 |
| 2010/0037961 A1 * | 2/2010 | Tysver | | G05D 7/0688 137/115.13 |
| 2010/0121553 A1 * | 5/2010 | Milnes | | F02C 7/232 701/100 |
| 2011/0146807 A1 * | 6/2011 | Bassmann | | F02C 7/222 137/15.05 |
| 2012/0261000 A1 * | 10/2012 | Futa | | F02C 7/232 137/101 |
| 2012/0266600 A1 * | 10/2012 | Bader | | F02C 7/236 60/734 |
| 2013/0269349 A1 * | 10/2013 | Rathinam | | F02C 7/232 60/734 |
| 2014/0053927 A1 * | 2/2014 | Podgorski | | F02C 6/08 137/596 |
| 2014/0165571 A1 * | 6/2014 | Vertenoeuil | | F02C 7/232 60/734 |
| 2015/0337736 A1 * | 11/2015 | Vertenoeuil | | F02C 7/236 60/734 |
| 2016/0368609 A1 * | 12/2016 | Schmidt | | F16K 39/028 |

* cited by examiner

AIRCRAFT FUEL SYSTEM WITH A BYPASS VALVE FOR A RETURN VALVE DURING ENGINE OFF OPERATION

CROSS-REFERENCE

This application claims priority under 35 U.S.C. § 119(e) from U.S. Provisional Application Ser. No. 62/076,290 filed Nov. 6, 2014, and under 35 U.S.C. §§ 119(a) and 365(b) from a French Application No. FR 1461897 filed Dec. 4, 2014, all of which are incorporated by reference in their entireties.

FIELD OF THE DISCLOSURE

The present disclosure generally relates to aircraft fuel systems, and in particular relates to a fuel path system of an aircraft for enhancing operations of fuel venting.

BACKGROUND OF THE INVENTION

On an aircraft, for example a transport aircraft, a fuel system of the aircraft, which is intended to supply fuel to an engine of the aircraft from at least one fuel tank, generally includes a fuel return system.

The fuel return system includes a fuel return valve (FRV) of the FRV type which is arranged on a return line. The return line is intended to be installed between the engine of the aircraft and the fuel tank of the aircraft.

This return system allows hot fuel to be returned from the engine to the fuel tank or tanks. The return valve must be open to allow return of the fuel. When the return valve is closed, the return path is closed and fuel cannot be returned to the tank of the aircraft.

The fuel return valve of a fuel return line requires a high pressure in order to operate. Such a pressure can only be generated when the engine is running. If the return valve is designed to be in the closed position when the engine is not in operation, no path for evacuation of the fuel can be provided in such a situation using this standard architecture.

Consequently, the fuel return valve is configured to be able to be opened and allow a return of fuel from the engine to the fuel tank when the engine is in operation; and to be closed and prevent a return of fuel from the engine to the fuel tank when the engine is not in operation.

However, after stoppage of the engine, the heat from the engine increases the pressure in a fuel circuit system. When the pressure reaches a critical value, the fuel must be evacuated from the fuel circuit system. To do this, the simplest and cheapest solution is to evacuate fuel to the atmosphere. The certification authorities do not, however, allow evacuation of fuel to the atmosphere. Thus, there is a need for developing an enhanced fuel path control system.

SUMMARY OF THE INVENTION

An object of the present invention is to provide a fuel return path when the engine is no longer in operation, which is simple to implement and complies with the requirements of the certification authorities.

The present invention concerns a fuel system of an aircraft, the fuel system being configured to supply an engine with fuel, the fuel system comprising a fuel return system with a fuel return valve arranged on a return line, the return line being intended to be mounted between an engine of the aircraft and a fuel tank of the aircraft, the return valve being configured to able to be opened and allow a return of fuel from the engine to the fuel tank when the engine is in operation, and to be closed and prevent a return of fuel from the engine to the fuel tank when the engine is not in operation.

According to the invention, the fuel system includes a bypass valve assembly mounted in parallel to the return valve, the bypass valve assembly being configured to allow a return of fuel from the engine to the fuel tank when the engine is not in operation.

Also, the fuel system includes a fuel return path in the fuel return system, allowing fuel to be returned from the engine to the fuel tank when the engine is no longer in operation, which remedies the above-mentioned disadvantage.

In this return system, the return valve is thus retained and a bypass valve is provided, which is a simply structured valve to ensure a bypass function when the engine is not in operation.

Advantageously, the bypass valve assembly includes a bypass valve provided with a cylindrical tube and a piston system, the piston system being configured to be able to be moved in the cylindrical tube as a function of a difference between pressures supplied at first and second pressure inlets of the cylindrical tube, so as to be able to be brought into the one or the other of the following positions:

at least one first or open position allowing a circulation of fluid between first and second fluid transport pipes via an inner chamber of the cylindrical tube; and at least one second or closed position preventing a circulation of fluid between the first and second fluid transport pipes.

Furthermore, advantageously, the piston system is configured to be brought into the open position when the pressure difference is less than a first predefined value; and into the closed position when the pressure difference is greater than a second predefined value.

Also, advantageously, the first and second fluid transport pipes are respectively connected to first and second pipe portions of the return line, situated in the return line respectively upstream and downstream of the return valve in the fluid flow direction.

Moreover, advantageously, the bypass valve assembly includes:

a first pressure pipe connected by one of its ends to the first fluid transport pipe and by the other of its ends to an opening of the cylindrical tube, representing the first pressure inlet; and a second pressure pipe connected by one of its ends to the second fluid transport pipe and by the other of its ends to an opening of the cylindrical tube, representing the second pressure inlet.

The present invention also concerns an aircraft, in particular a transport aircraft, provided with at least one such fuel system.

BRIEF DESCRIPTION OF THE DRAWINGS

The attached drawings will facilitate understanding of how the invention may be implemented. On the figures, identical references designate similar elements.

DETAILED DESCRIPTION OF THE PREFERRED EMBODIMENTS

Figure 1:
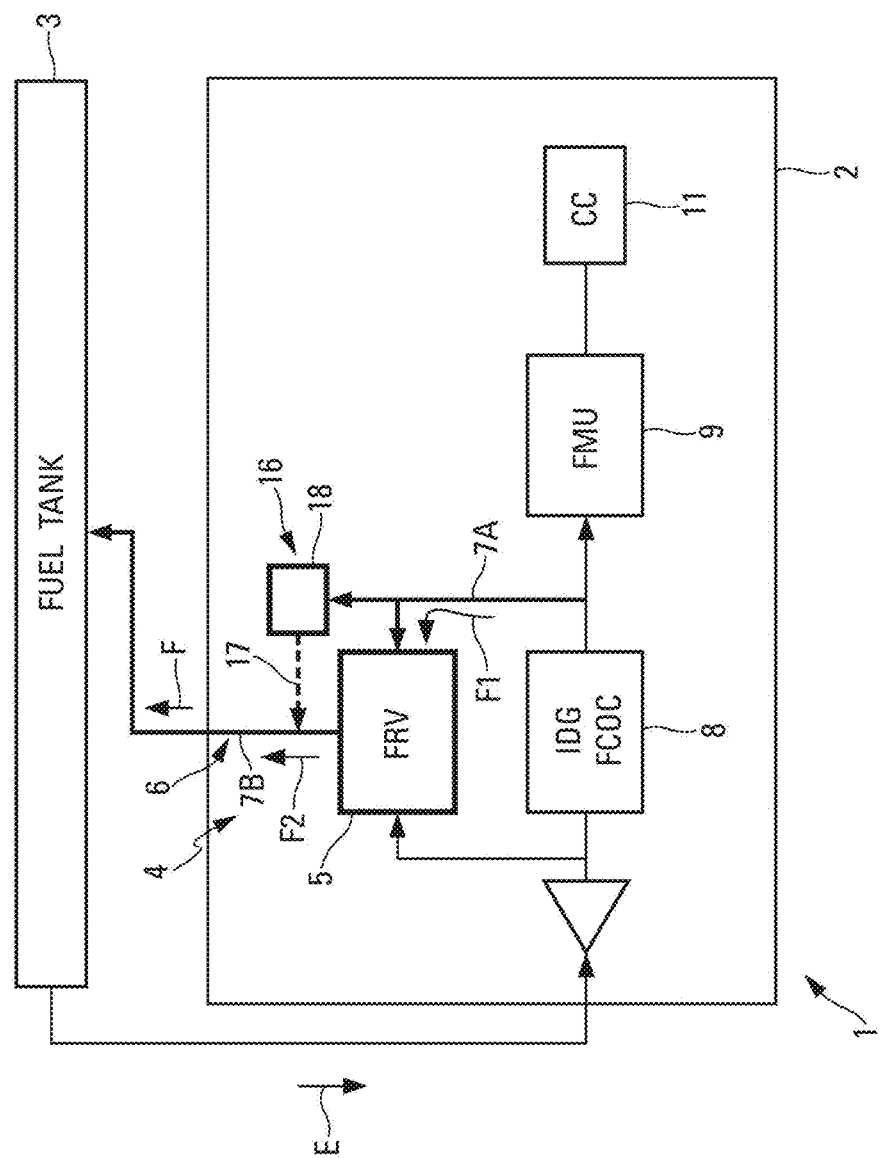
FIGS. 1 and 2 depict a summary diagram of a particular embodiment of a fuel system of an aircraft provided with a fuel return system equipped with a bypass valve assembly, in two different positions respectively.
Figure 2:
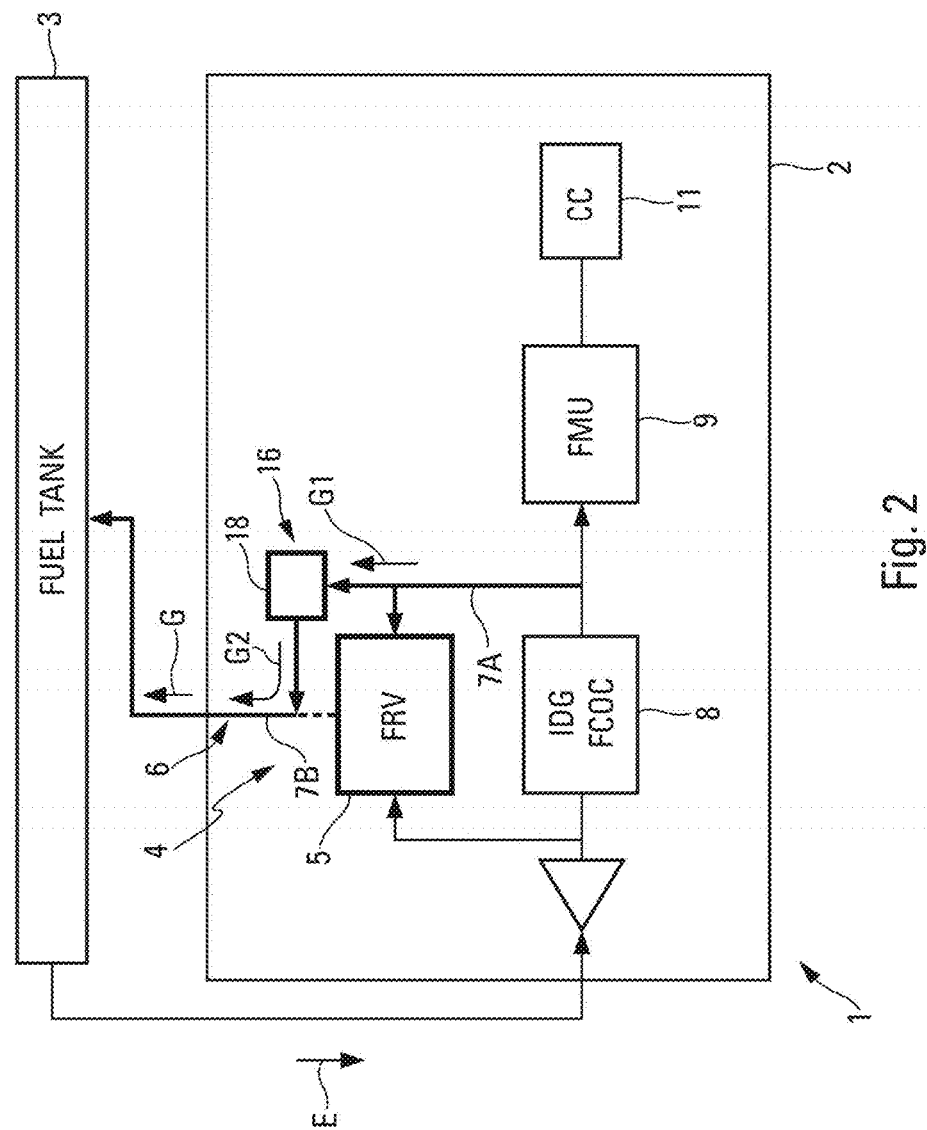

FIGS. 1 and 2 show diagrammatically a fuel system 1 of an aircraft. The fuel system 1 is configured to supply fuel to an engine 2 of the aircraft from at least one fuel tank 3, in the direction illustrated by an arrow E.

Figure 3:
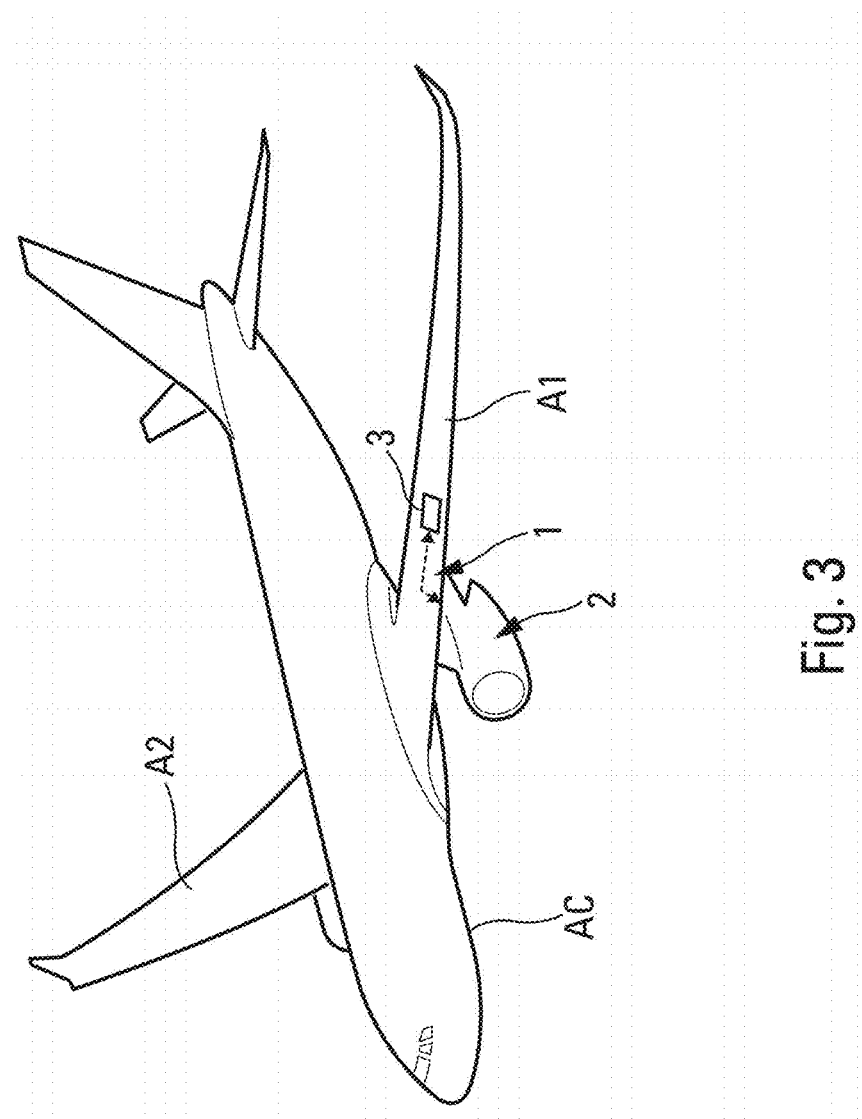
FIG. 3 is a diagrammatic, perspective view of an aircraft equipped with such a fuel system.

FIG. 3 shows diagrammatically an aircraft AC, in this case a transport aircraft, having the fuel system 1 which supplies one of the engines 2 of the aircraft AC from a fuel tank 3 arranged in one A1 of the wings A1 and A2 of the aircraft AC.

The fuel system 1 includes a fuel return system 4 (referred to below as "return system 4") as described below, which allows the return of fuel from the engine 2 to the fuel tank 3, as illustrated by an arrow F in FIG. 1.

The fuel return system 4 includes a fuel return valve (FRV) 5 (referred to below as "return valve 5") of the FRV type, which is arranged on a return line 6. The return line 6 includes pipe portions 7A and 7B on either side of the return valve 5 and is mounted between the engine 2 of the aircraft, in a main fuel circuit, and the fuel tank 3.

The return valve 5 is configured to be able to be opened and allow a return of fuel from the engine 2 to the fuel tank 3, as illustrated by the arrow F in FIG. 1, when the engine 2 is in operation and a high pressure is generated in the fuel system 1, namely a pressure greater than a predefined value. In this situation, the returned fuel flows successively through the pipe portion 7A, the return valve 5 and the pipe portion 7B, in the direction indicated by arrows F1, F2 and F in FIG. 1.

The return valve 5 is also configured to be closed and prevent a return of fuel from the engine 2 to the fuel tank 3 when the engine 2 is not in operation, as indicated diagrammatically by a part of the pipe portion 7B shown in dotted lines in the example of FIG. 2.

For illustration, as shown in FIGS. 1 and 2, the engine 2 is in particular provided with the following elements: a system 8 of the Integrated Driving Generator (IDG) Fuel Cooled Oil Cooler (FCOC) type; a fuel metering unit (FMU) 9 of the FMU type; and a combustion chamber (CC) 11.

According to the invention, the return system 4 furthermore includes a bypass valve assembly 16.

As depicted in FIGS. 1 and 2, the bypass valve assembly 16 is mounted in parallel with the return valve 5. As specified below, this bypass valve assembly 16 is configured to be able to be opened and allow a return of fuel from the engine 2 to the fuel tank 3 via the bypass assembly 16, as illustrated by an arrow G in FIG. 2, when the engine 2 is not in operation and the return valve 5 is closed. In this situation, the returned fuel flows successively through the pipe portion 7A, the bypass valve assembly 16 and the pipe portion 7B, in the direction indicated by arrows G1, G2 and G in FIG. 2.

Further, the bypass valve assembly 16 is configured to be closed and not allow a return of fuel from the engine 2 to the fuel tank 3 (via the bypass assembly 16), when the engine 2 is in operation, as illustrated in FIG. 1 by a dotted link 17.

In this return system 4, the return valve 5 is retained and continues to function in the usual fashion when the engine 2 is in operation, and a bypass valve assembly 16 is provided which is equipped with a bypass valve 18 to ensure a bypass function when the engine 2 is not in operation.

This bypass valve assembly 16 allows a normal operation of the return system 4 when the engine 2 in operation; does not allow any leakage when the engine 2 is in operation; allows a bypass circulation in specific cases, in particular when the engine 2 is not in operation; and is an additional device, allowing avoidance of modifications to the return valve 5.

Figure 4:
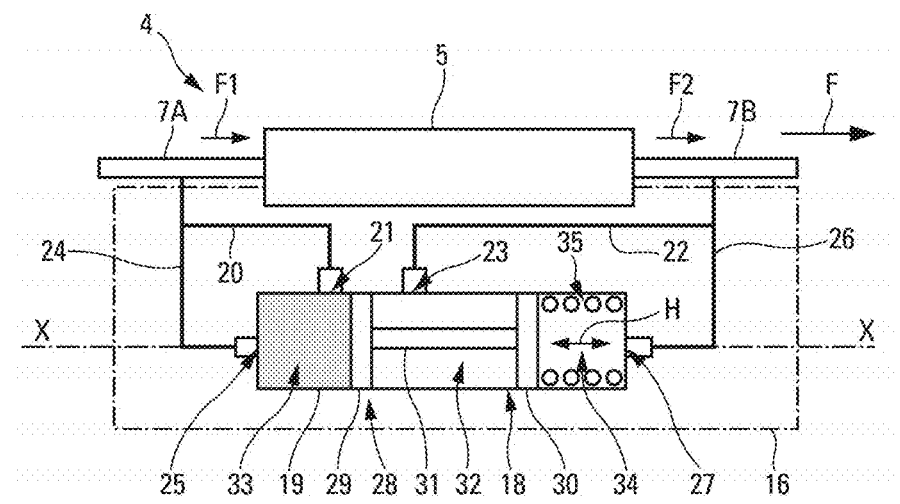
FIGS. 4 and 5 depict a summary diagram of an embodiment of a bypass valve assembly, in two different positions respectively.
Figure 5:
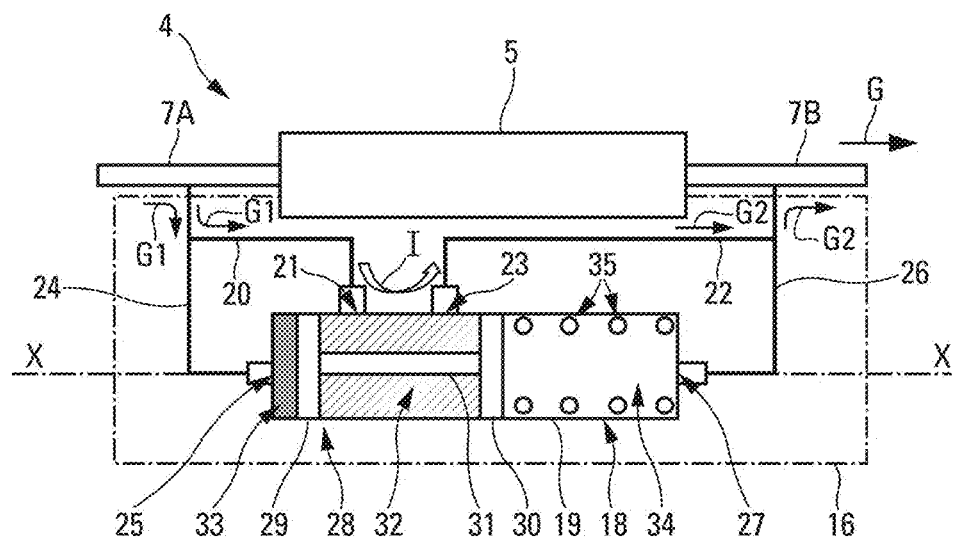

FIGS. 4 and 5 depict diagrammatically a part of the return system 4 provided with the bypass valve assembly 16, in two different positions. The position in the example of FIG. 4 corresponds to the situation of FIG. 1, and the position of the example of FIG. 5 corresponds to the situation of FIG. 2.

This bypass valve assembly 16 includes the bypass valve 18. The bypass valve 18 is, for example, a servo valve provided with a cylindrical tube 19 with a longitudinal axis X-X. The bypass valve assembly 16 also includes a fluid transport pipe 20 (referred to below as "pipe 20").

The pipe 20 is connected by one of its ends, namely the upstream end in the flow direction G1 (FIG. 5), to the pipe portion 7A and by the other of its ends, namely the downstream end in the flow direction G1, to an opening 21 of the cylindrical tube 19, known as the first fluid inlet; and a fluid transport pipe 22 (referred to below as "pipe 22"). The pipe 22 is connected by one of its ends, namely the downstream end in the flow direction G2 (FIG. 5), to the pipe portion 7B and by the other of its ends, namely the upstream end in the flow direction G2, to another opening 23 of the cylindrical tube 19, known as the second fluid inlet.

A fuel circulation path can thus be established from the pipe portion 7A to the pipe portion 7B in parallel to the return valve 5, via pipes 20 and 22 and the bypass valve 18 when it is open, as described below.

The bypass valve assembly 16 also includes a pressure pipe 24 which is connected by one of its ends to the pipe 20 and by the other of its ends to an opening 25 of the cylindrical tube 19, known as the first pressure inlet; and a pressure pipe 26 which is connected by one of its ends to the pipe 22 and by the other of its ends to an opening 27 of the cylindrical tube 19, known as the second pressure inlet;

These pressure pipes 24 and 26 provide indications of the pressure existing in the pipe portions 7A and 7B as described below.

The openings 25, 21, 23, 27 are located on the cylindrical tube 19 such that the first pressure inlet 25, the first fluid inlet 21, the second fluid inlet 23 and the second pressure inlet 27 respectively are successively offset longitudinally along the longitudinal axis X-X of the cylindrical tube 19.

Furthermore, the assembly 16 includes a piston system 28. The piston system 28 is movable in the cylindrical tube 19 along the longitudinal axis X-X, as illustrated by the double arrow H in FIG. 4.

The piston system 28 includes two pistons 29 and 30 connected together by a shaft 31 so as to form three chambers 32, 33 and 34 in the cylindrical tube 19, namely an inner chamber 32 between the two pistons 29 and 30, and outer chambers 33 and 34 on either opposite side of the piston system 28.

The bypass valve 16 is configured such that the pressure inlets 25 and 27 always open respectively into the outer chambers 33 and 34. For this, the pressure inlets 25 and 27 are preferably provided at the longitudinal ends of the cylindrical tube 19, as indicated in FIGS. 4 and 5.

The piston system 28 is elastically stressed by normal elastic means 35 (e.g., a spring, etc.) and is configured to be able to be moved in the cylindrical tube 19 as a function of the relative pressure predominating in the outer chambers 33 and 34, which is representative of the relative pressure in the pipe portions 7A and 7B (connected to the outer chambers 33 and 34 via pressure pipes 24 and 26).

More specifically, the piston system 28 is configured such that it can be brought into the one or the other of the following positions:

at least one first or open position in which the piston system 28 is in a longitudinal position such that the fluid inlets 21 and 23 together open into the inner chamber 32. This longitudinal position allows a circulation of fluid between pipes 20 and 22 via the inner chamber 32, as illustrated by an arrow I in FIG. 5 and the hatching in the inner chamber 32. This open position allows the creation of a fuel circulation path from the pipe portion 7A to the pipe portion 7B in parallel to the return valve 5, via pipes 20 and 22 and the bypass valve 18; and at least one second or closed position in which the piston system 28 is in a longitudinal position such that the fluid inlets 21 and 23 do not open simultaneously into the inner chamber 32, thus preventing the circulation of fluid between pipes 20 and 22 via the inner chamber 32, as shown in FIG. 4.

The piston system 28 is configured such that it can be brought:

into the open position (FIG. 5), creating a fuel return path when the engine 2 is not in operation and the pressures in the pipe portions 7A and 7B are similar, i.e. the pressure difference between the pipe portions 7A and 7B is less than a first (low) predefined value; and into the closed position (FIG. 4), when the engine 2 is in operation and the pressure in the pipe portion 7A is substantially greater than the pressure in the pipe portion 7B, i.e., the pressure difference between the pipe portions 7A and 7B is greater than a second (high) predefined value.

This bypass valve assembly 16, which is integrated in the return system 4, therefore allows creation of the fuel return path when the engine is no longer in operation. This provides a simple solution which does not require any modification to the return valve 5 and can be installed on conventional systems with reduced cost.

While at least one exemplary embodiment of the present invention has been shown and described, it should be understood that modifications, substitutions and alternatives may be apparent to one of ordinary skill in the art and can be made without departing from the scope of the invention described herein. This application is intended to cover any adaptations or variations of the specific embodiments discussed herein. In addition, in this application, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

What is claimed is:

1. A fuel system of an aircraft configured to supply an engine of the aircraft with fuel from a fuel tank of the aircraft, the fuel system comprising:
   a fuel return valve arranged on a return line with a first pipe arranged on a first side of the fuel return valve and a second pipe arranged on a second side of the fuel return valve, the return line mounted between the engine of the aircraft and the fuel tank of the aircraft, the return valve being configured to be opened and allow a return of fuel from the engine to the fuel tank when the engine is in operation, and to be closed and prevent the return of fuel from the engine to the fuel tank when the engine is not in operation, and
   a bypass valve assembly mounted in parallel to the return valve, the bypass valve assembly being configured to allow the return of fuel from the engine to the fuel tank when the engine is not in operation, wherein the bypass valve assembly includes a bypass valve comprising:
      a cylindrical tube,
      a piston in the cylindrical tube,
      a first fluid transport pipe having a first end connected to the first pipe of the fuel return line and a second end connected to a first opening of the cylindrical tube,
      a second fluid transport pipe having a first end connected to a second opening in the cylindrical tube and a second end connected to the second pipe of the fuel return valve,
      a first pressure pipe connected at a first end to the first fluid transport pipe and connected at a second end to a third opening of the cylindrical tube, the third opening comprising a first pressure inlet; and
      a second pressure pipe connected at a first end to the second fluid transport pipe and connected at a second end to a fourth opening of the cylindrical tube, the fourth opening representing a second pressure inlet,
      wherein the piston is configured to move in the cylindrical tube as a function of a difference between pressures supplied at the first and second pressure inlets of the cylindrical tube, so as to be able to be brought into at least one of the following positions:
      at least one first or open position allowing a circulation of fluid between the first and second fluid transport pipes via an inner chamber of the cylindrical tube; and
      at least one second or closed position preventing a circulation of fluid between the first and second fluid transport pipes.

2. The fuel system as claimed in claim 1, wherein the piston system is configured to be brought into the open position when a pressure difference is less than a first predefined value; and into the closed position when the pressure difference is greater than a second predefined value.

3. An aircraft having a fuel system configured to supply an engine of the aircraft with fuel from a fuel tank of the aircraft, the fuel system comprising:
   a fuel return valve arranged on a return line with a first pipe arranged on a first side of the fuel return valve and a second pipe arranged on a second side of the fuel return valve, the return line mounted between the engine of the aircraft and the fuel tank of the aircraft, the return valve configured to be opened and allow a return of fuel from the engine to the fuel tank when the engine is in operation, and to be closed and prevent the return of fuel from the engine to the fuel tank when the engine is not in operation, and
   a bypass valve assembly mounted in parallel to the return valve, the bypass valve assembly being configured to allow the return of fuel from the engine to the fuel tank when the engine is not in operation, wherein the bypass valve assembly includes a bypass valve comprising:
      a cylindrical tube,
      a piston in the cylindrical tube,
      a first fluid transport pipe having a first end connected to the first pipe of the fuel return line and a second end connected to a first opening of the cylindrical tube, a second fluid transport pipe having a first end connected to a second opening in the cylindrical tube and a second end connected to the second pipe of the fuel return valve, a first pressure pipe connected at a first end to the first fluid transport pipe and connected at a second end to a third opening of the cylindrical tube, the third opening comprising a first pressure inlet, and a second pressure pipe connected at a first end to the second fluid transport pipe and connected at a second end to a fourth opening of the cylindrical tube, the fourth opening representing a second pressure inlet, wherein the piston is configured to move in the cylindrical tube as a function of a difference between pressures supplied at the first and second pressure inlets of the cylindrical tube, so as to be able to be brought into at least one of the following positions:

at least one first or open position allowing a circulation of fluid between the first and second fluid transport pipes via an inner chamber of the cylindrical tube; and at least one second or closed position preventing a circulation of fluid between the first and second fluid transport pipes.

4. The aircraft of claim 3, wherein the piston system is configured to be brought into the open position when a pressure difference is less than a first predefined value; and into the closed position when the pressure difference is greater than a second predefined value.

* * * * *